United States Patent [19]

Tsai et al.

[11] Patent Number: 5,808,715
[45] Date of Patent: Sep. 15, 1998

[54] LIQUID CRYSTAL DISPLAY DEVICES HAVING UNDERCOAT AND OVERCOAT MADE OF $TiO_2$—$SiO_2$ COMPOSITE MATERIAL

[75] Inventors: Rung-Ywan Tsai, Kaohsiung; Fang-Chuan Ho, Hsinchu, both of Taiwan

[73] Assignee: Industrial Technology Research Institute, Hsinchu, Taiwan

[21] Appl. No.: 933,903

[22] Filed: Sep. 19, 1997

[51] Int. Cl.[6] .................................................. G02F 1/333
[52] U.S. Cl. .......................................... 349/122; 349/158
[58] Field of Search ..................................... 349/122, 158

[56] References Cited

U.S. PATENT DOCUMENTS

| | | | |
|---|---|---|---|
| 5,136,406 | 8/1992 | Kato et al. | 349/76 |
| 5,156,884 | 10/1992 | Tanitsu et al. | 427/558 |
| 5,272,554 | 12/1993 | Ji et al. | 349/27 |
| 5,282,068 | 1/1994 | Inaba et al. | 349/148 |
| 5,406,396 | 4/1995 | Akatsuka et al. | 349/118 |
| 5,617,230 | 4/1997 | Ohgawara et al. | 349/110 |
| 5,677,705 | 10/1997 | Shimura et al. | 345/95 |
| 5,700,391 | 12/1997 | Nogami et al. | 252/299.01 |

*Primary Examiner*—William L. Sikes
*Assistant Examiner*—Tiep H. Nguyen
*Attorney, Agent, or Firm*—Sughrue, Mion, Zinn, Macpeak & Seas, PLLC

[57] ABSTRACT

A liquid crystal display device having $TiO_2$—$SiO_2$ composite layers used as undercoat and overcoat is provided. The $TiO_2$—$SiO_2$ composite layers serving as the undercoat and overcoat of transparent conductive electrodes are formed by a low temperature ion-assisted electron gun evaporation or sputtering process, wherein the $TiO_2$—$SiO_2$ composite materials can also be used as hard layers to protect the surfaces of transparent plastic substrates. These $TiO_2$—$SiO_2$ composite layers have superior insulation, a high degree of hardness and smoothness. Consequently, the advantages of the $TiO_2$—$SiO_2$ composite layer are as follows: (1) the out diffusion of impurities (sodium ions) can be prevented from soda lime glass into liquid crystal to destroy the property of the liquid crystal; (2) short circuit caused by impurities having the same size as the gap between the electrodes can also be prevented; (3) the $TiO_2$—$SiO_2$ layer can be used as a hard layer to protect the surface of the plastic substrate from scratching damage; and (4) the $TiO_2$—$SiO_2$ layer can be used as an isolating layer to prevent the plastic substrate from releasing water and gas stored thereinside and causing poor adhesion to the transparent conductive layer formed thereon.

12 Claims, 2 Drawing Sheets

LIQUID CRYSTAL DISPLAY DEVICES HAVING UNDERCOAT AND OVERCOAT MADE OF TIO$_2$— SIO$_2$ COMPOSITE MATERIAL

BACKGROUND OF THE INVENTION

1. Field of the Invention

The present invention relates to a liquid crystal display (LCD) device, and in particularly to a liquid crystal display device having undercoat and overcoat made of a TiO$_2$—SiO$_2$ composite material.

2. Description of the Related Art

Nowadays, the development of information technology demands the improvement of devices to display various data. Among the known display devices, which are able to be used in different applications, a liquid crystal display device has drawn a world-wide attention due to its features of small size and light weight. As shown in FIG. 1, a conventional liquid crystal display device comprises glass substrates 2a and 2b; transparent conductive layers 4a and 4b respectively formed on the first surfaces of glass substrates 2a and 2b; alignment films 5a and 5b respectively formed on the transparent conductive layers 4a and 4b; undercoat 3a formed between the transparent conductive layer 4a and glass substrate 2a, and undercoat 3b formed between the transparent conductive layer 4b and glass substrate 2b, respectively; liquid crystal 6 filled between the glass substrates 2a and 2b; sealant 7 for sealing the liquid crystal 6 between the glass substrates 2a and 2b; and polarizing plates 1a and 1b positioned on the second surfaces of the glass substrates 2a and 2b, respectively. Each transparent conductive layer, which is made of an indium tin oxide (ITO) material, has high transparency, superior conductivity, a high degree of flatness and durability against scratch, and does not react with the liquid crystal.

Generally, cheaper soda-lime glass is often used as the glass substrate. However, 14% of the soda lime glass in weight ratio is sodium ions which readily diffuse from the substrate into the liquid crystal resulting in the degradation of the liquid crystal. In order to prevent the out diffusing of sodium ions from the glass substrate into the liquid crystal, a SiO$_2$ barrier layer 50~150 nm in thickness for use as an undercoat is formed between the transparent conductive layer and soda lime glass substrate. However, 10% of sodium ions still diffuse into the liquid crystal, even though the undercoat is formed. To resolve this problem, Corning 7059 or 1737 glass is preferably used as a substrate, but the Corning 7059 or 1737 is costly resulting in increased manufacturing costs for such LCDs.

Furthermore, since the entering external conductive impurities with the size equal to or larger than the gap between the upper and lower electrodes may cause a short circuit, an overcoat must be formed between the ITO layer and the aligning layer, wherein the overcoat must has an efficient insulating capability and sufficient hardness to protect the electrode. Material often utilized as an overcoat is oxide (such as, SiO$_2$ or TiO$_2$), nitride (Si$_3$N$_4$), or perovskite having a piezoelectric property (such as, barium titanate). The related prior art is disclosed in "Preparation of amorphous BaTiO$_3$ thin films on indium tin oxide-coated soda lime glass by metalorganic chemical vapor deposition", authored by Y. S. Yoon et al., at J. Vac. Sci. Technol. A12, 751–753 (1994), and "Ferro-electric liquid crystal device", authored by Y. Hanyu et al. at U.S. Pat. No. 4,932,757, etc.

However, the overcoat made of one of these materials mentioned above is formed by a chemical vapor deposition or sol-gel, wherein the temperature for the process is set at above 250° C. In this high-temperature process, sodium ions can easily diffuse out of the alkali glass. In addition, these materials are not suitable for substrates (such as, plastic substrates) which are sensitive to high temperatures.

Although plastics (such as, acrylic, polyethylene terephthalate (PET) or polycarbonate(PC)) can not endure high temperatures, the plastics instead of glass as a substrate allows portable LCDs to meet the requirements of strict thickness and lightness. Therefore, the temperature of the LCD process can not be higher than 200° C. if the plastic substrates are used. In addition, since plastics are readily to be scratched, the outside surface of the plastics should be coated with a hard layer. Moreover, plastic substrate that easily absorbs moisture can release moisture during evaporation, causing poor adhesion to a deposited layer. Furthermore, since the difference of thermal expansion coefficients between the plastic substrate and the deposited layer such as an ITO layer is great, cracks on the deposited layer are easily encountered. Therefore, the above-mentioned problems can reduce the performance and stability of such LCDs.

U.S. Pat. No. 5,237,439 provides dipping and baking approaches by which resin (such as, organosilane, acrylic, melamine or urethane) doped with boron, used as a hard layer and having a thickness of 2~6 $\mu$m, is formed on the two surfaces of a plastic substrate having a thickness of 0.1~0.5 mm to protect the plastic substrate, to absorb the moisture released from the plastic substrate, and to reduce the thermal stress between the plastic substrate, undercoat (10~60 nm thick), and ITO layer to prevent the ITO layer from cracking. Alternatively, a TiO$_x$ buffer layer may be disposed between a non-boron doped organic layer used as a hard layer and an undercoat to attain the same function as that of the boron-doped organic layer. The TiO$_x$ buffer layer, undercoat and ITO layer are all formed by a sputtering process. Thus, the manufacture of the transparent conductive electrodes, containing dipping and sputtering processes, is complicated and costly. Meanwhile, if this method is applied to soda lime glass, damage to the liquid crystal caused by the out diffusion of the sodium ions from the glass substrate into the liquid crystal can not be prevented.

As described above, the temperature for forming the overcoat is typically higher than 250° C. To use plastics as a substrate for LCDs and not to affect the hardness and electricity of the overcoat, U.S. Pat. No. 5,245,457 issued to S. Fukuchi disclosed a method for forming the overcoat at a low-temperature (under 200° C.). A coating containing silica is formed on the ITO layer and plastic substrate, then a UV light treatment and low-temperature treatment are performed to prevent the plastic substrate from incurring damage. However, the coating has shrunk after condensation and dehydrolysis, so that voids have been easily formed inside the coating, causing poor adhesion to the coating. As a result, impurities can easily diffuse through the voids into the liquid crystal. Therefore this method is not suitable for soda lime glass. Moreover, since the low-temperature of the process is about 170° C., it is still restricted to a plastic substrate with a deformity temperature less than 170° C.

Accordingly, the object of the invention is to provide liquid crystal displays having undercoat and overcoat made of a TiO$_2$—SiO$_2$ composite material. In the liquid crystal displays, TiO$_2$—SiO$_2$ composite layers used as undercoat and overcoat for the LCD devices are formed by a low temperature ion-assisted electron gun evaporation or sputtering process. Meanwhile, these TiO$_2$—SiO$_2$ composite layers can also be utilized as hard layers to protect the second surfaces of the transparent substrate.

The $TiO_2$—$SiO_2$ composite layers utilized in this invention have superior insulation, a high degree of hardness and smoothness. Therefore the advantages of introducing the $TiO_2$—$SiO_2$ composite layers into the construction of liquid crystal display are as follows:

(1) prevent the out diffusion of impurities (sodium) of soda lime glass substrate from entering the liquid crystal and causing damage;

(2) prevent short circuits between two electrodes, caused by the conductive impurity having the same size as the gap between the two electrodes;

(3) serve as hard layers to protect the surfaces of plastic substrates from damage;

(4) serve as isolating layers for water and gas to prevent the releasing of water and gas from plastic substrates during a vacuum evaporation process, resulting in poor adhesion to formed layers;

(5) serve as bonding layers to prevent cracks, caused by a difference in the coefficients of thermal expansion between the ITO layer and plastic substrate; and (6) serve as transmittance-enhanced layers to increase the visible light transmittance of the transparent conductive electrodes of LCDs.

BRIEF DESCRIPTION OF THE DRAWINGS

The present invention will become more fully understood from the detailed description given hereinbelow and the accompanying drawings, which are provided for illustration of preferred embodiments only and should not be construed as limiting the scope of the present invention, and wherein.

DETAILED DESCRIPTION OF THE INVENTION

Figure 1:
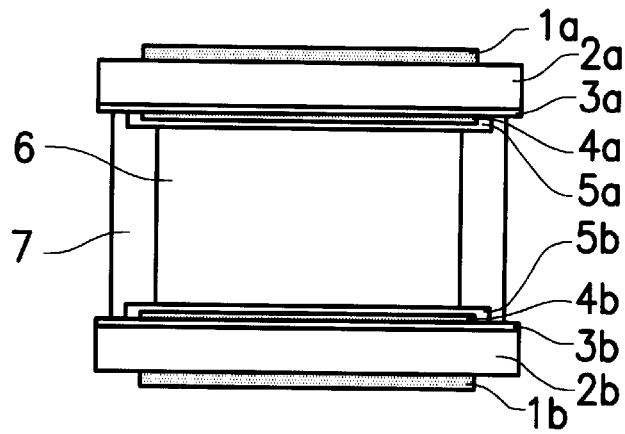
FIG. 1 is a cross-sectional view illustrating a LCD according to the prior art.
Figure 2:
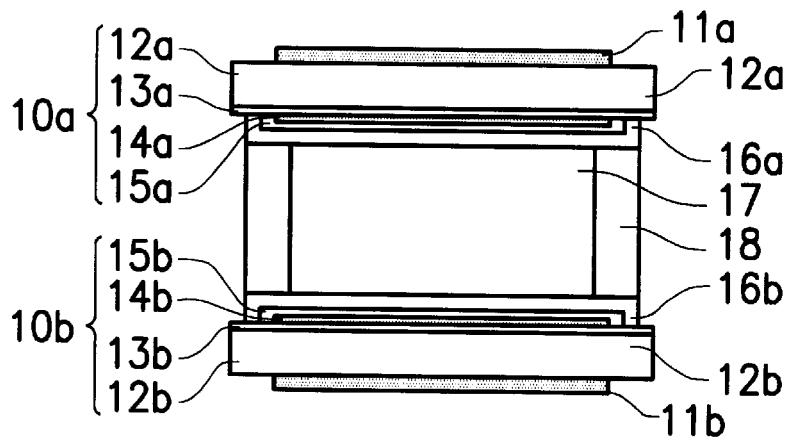
FIG. 2 is a cross-sectional view illustrating a LCD according to a first embodiment of the invention.

The glass substrate and the plastic substrate adopted in LCD manufacturing according to this invention are soda lime glass substrate having a thickness of about 1.1 mm, and polyethylene terephthalate (PET) substrate having a thickness of about 0.5 mm, respectively. As shown in FIG. 2, when using the soda lime glass as a substrate, the cross-sectional structure of an entire LCD comprises a first transparent conductive electrode 10a; a first polarizing plate 11a formed on the second surface of the first transparent conductive electrode; a first aligning layer 16a formed on the first surface of the first transparent conductive electrode 10a; a second transparent conductive electrode 10b parallel to the first transparent conductive electrode 10a and separated from the first transparent conductive electrode 10a by a distance; a second polarizing plate 11b formed on the second surface of the second transparent conductive electrode 10b; a second aligning layer 16b formed on the first surface of the second transparent conductive electrode 10b; and liquid crystal 17 positioned between the first aligning layer 16a and second aligning layer 16b. Furthermore, the structure of this LCD is characterized in that the structure of the first transparent conductive electrode 10a from the second surface toward the first surface includes a soda lime glass substrate 12a, $TiO_2$—$SiO_2$ composite undercoat 13a, transparent conductive ITO layers 14a, and $TiO_2$—$SiO_2$ composite overcoat 15a, and the structure of the second transparent conductive electrode 10b from the second surface toward the first surface includes a soda lime glass substrate 12b, $TiO_2$—$SiO_2$ composite undercoat 13b, transparent conductive ITO layers 14b, and $TiO_2$—$SiO_2$ composite overcoat 15b, respectively.

Furthermore, the method for manufacturing the LCD according to the invention is performed at room temperature. First, two $TiO_2$—$SiO_2$ composite undercoats 13a and 13b having a thickness of 20~150 nm (preferably 40~100 nm) are formed on two soda lime glass substrates 10a and 10b, respectively, by an ion-assisted electron gun evaporation or sputtering process to prevent the out diffusion of sodium ions from the soda lime glass substrates 10a and 10b through the ITO layers 14a and 14b into the liquid crystal 17. Then, transparent conductive ITO layers 14a and 14b having a thickness of about 60 nm are formed in the same vacuum chamber by the same process. After that, two $TiO_2$—$SiO_2$ composite overcoats 15a and 15b, each having a thickness of about 30~100 nm (preferably 40~80 nm), are formed on the top of ITO layers 14a and 14b to prevent the short circuit between two electrodes caused by conductive impurities, such that two transparent conductive electrodes 10a and 10b of the LCD are completely fabricated. In addition, it may be necessary to form a circuit pattern on each transparent conductive ITO layer 14a and 14b by an etching process before forming the $TiO_2$—$SiO_2$ composite overcoat 15a and 15b. After fabricating the transparent conductive electrodes of an LCD, two aligning layers 16a and 16b are formed on the first surfaces of transparent conductive electrodes 10a and 10b, respectively, to control the molecular arrangement of the liquid crystal 17, then printed dot and frame are formed, and spacer is disposed to separate the two electrodes from each other by a constant distance. Next the space between the first surface of the two electrodes is filled with the liquid crystal 17 which is packed between the two electrodes by a sealant 18. Finally, two polarizing plates 11a and 11b having a polarizing angle of 90° with respect to each other are disposed on the second surfaces of the two transparent conductive electrodes 10a and 10b, respectively.

Figure 3:
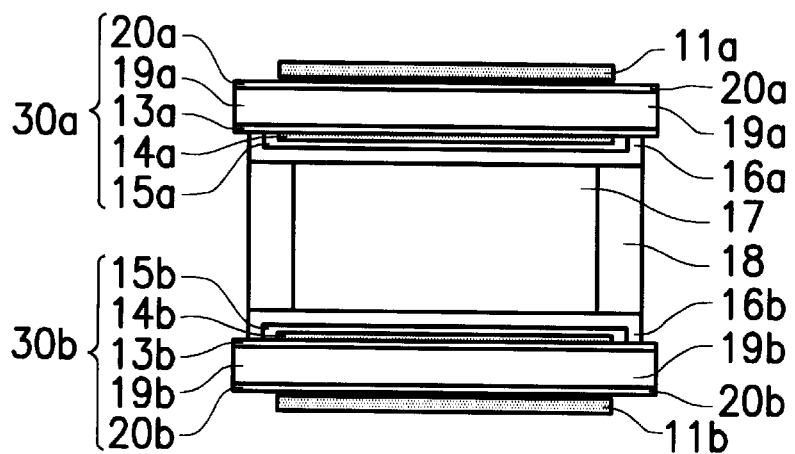
FIG. 3 is a cross-sectional view illustrating a LCD according to a second embodiment of the invention.

Furthermore, by using a transparent plastic material (such as, polyethylene terephthalate) instead of the abovementioned soda lime glass as a substrate material, a LCD having the same structure as that in FIG. 2 can be fabricated. As shown in FIG. 3, a cross-sectional view is provided, illustrating another LCD according to a second embodiment of the invention, wherein a polyethylene terephthalate material is used as a substrate material. This LCD comprises a first transparent conductive electrode 30a; a first polarizing plate 11a formed on the second surface of the first transparent conductive electrode 30a; a first aligning layer 16a formed on the first surface of the first transparent conductive electrode 30a; a second transparent conductive electrode 30b parallel to the first transparent conductive electrode 30a; a second polarizing plate 11b formed on the second surface of the second transparent conductive electrode 30b; a second aligning layer 16b formed on the first surface of the second transparent conductive electrode 30b; and liquid crystal 17 filled in the space between the first aligning layer 16a and the second aligning layer 16b. Moreover, the structure of the LCD is characterized in that the structure of the first transparent conductive electrode 30a from the second surface toward the first surface includes a $TiO_2$—$SiO_2$ composite hard layer 20a, a polyethylene terephthalate layer 19a, a $TiO_2$—$SiO_2$ composite undercoat 13a, a transparent conductive ITO layer 14a, and a $TiO_2$—$SiO_2$ composite overcoat 15a, and the structure of the second transparent conductive electrode 30b from the second surface toward the first surface includes a $TiO_2$—$SiO_2$ composite hard layer 20b, a polyethylene terephthalate layer 19b, a $TiO_2$—$SiO_2$ composite undercoat 13b, a transparent conductive ITO layer 14b, and a $TiO_2$—$SiO_2$ composite overcoat 15b, respectively.

In the second embodiment, most processes are the same as those in FIG. 2 except that the $TiO_2$—$SiO_2$ composite hard layers 20a and 20b are additionally formed on the second surface of the plastic substrates. Similarly, the $TiO_2$—$SiO_2$ composite hard layers 20a and 20b having a thickness of 2~6 μm each are formed by a low temperature ion-assisted electron gun evaporation or sputtering process. Therefore, the polyethylene terephthalate layers 19a and 19b are not subjected to high temperature.

The $TiO_2$—$SiO_2$ composite undercoats 13a and 13b, $TiO_2$—$SiO_2$ composite overcoats 15a and 15b, $TiO_2$—$SiO_2$ hard layers 20a and 20b and transparent conductive ITO layers 14a and 14b of the LCD according to the invention all are formed by an ion-assisted electron gun evaporation process at room temperature. The raw materials for forming the $TiO_2$—$SiO_2$ composite layers are $Ti_2O_3$ and $SiO_2$. The raw material for forming the ITO layers is indium tin oxide, wherein the weight ratio of the $SnO_2$ is 10% ($In_2O_3$-10%$SnO_2$). To control the composition of the $TiO_2$—$SiO_2$ composite material, the evaporation rate of the $TiO_2$ is fixed at 0.2 nm/s while that of the $SiO_2$ is varied from 0 to 2 nm/s. The evaporation rate of the ITO is fixed at 4 nm/s. Furthermore, a mixture gas of Ar and $O_2$ with the flow rates of 18 mls/min and 30 mls/min, respectively (that is, 18 and 30 sccm), is used as the ion source. The discharge voltage and discharge current are 1000V and 40A, respectively, and the ion energy is about 90 eV. Since the heat in the entire $TiO_2$—$SiO_2$ composite material process is coming from the evaporation sources, which raising the substrate temperature up to 80° C., a PET plastic substrate is not affected. Meanwhile, this process is suitable for other plastic materials which are temperature sensitive. For example, the polyethylene terephthalate substrate can be replaced with transparent plastic materials, such as acrylic resin, epoxy resin and polycarbonate resin.

In the above-mentioned embodiments, sealant 18 is used to pack the liquid crystal 17 between substrates 12a and 12b, or between substrates 19a and 19b.

Figure 4:
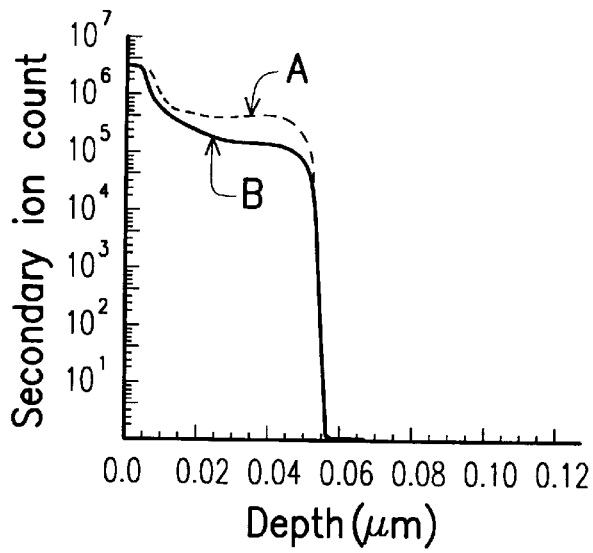
FIG. 4 is a graph showing sodium ion concentration-depth distributions of two kinds of alkali glass which have experienced a heat treatment in air at 500° C. for one hour.

Referring to FIG. 4, the sodium ion concentration-depth distributions of two kinds of alkali glass which have experienced a thermal process in air of 500° C. for one hour are shown, wherein a $TiO_2$—$SiO_2$ composite undercoat containing 44.4 at % $TiO_2$ and with a thickness of about 100 nm and ITO layer having a thickness of about 60 nm are formed on a first alkali glass while a pure $SiO_2$ undercoat having a thickness of about 100 nm and ITO layer having a thickness of about 60 nm are formed on a second alkali glass. In FIG. 4, curve A represents a concentration distribution of sodium ions of the second alkali glass in the ITO layer, wherein the $SiO_2$ layers are used as undercoats, while curve B represents a concentration distribution of sodium ions of the first alkali glass in the ITO layers, wherein each $TiO_2$—$SiO_2$ composite layer containing 44.4 at % $TiO_2$ is used as an undercoat. As can be learned from FIG. 4, the curve A shows a high-concentration distribution of sodium ions in comparison to curve B. This means that the capability to inhibit the out diffusing of sodium ions from glass substrate into the ITO layers in the invention is greater than that in the prior art.

Figure 5:
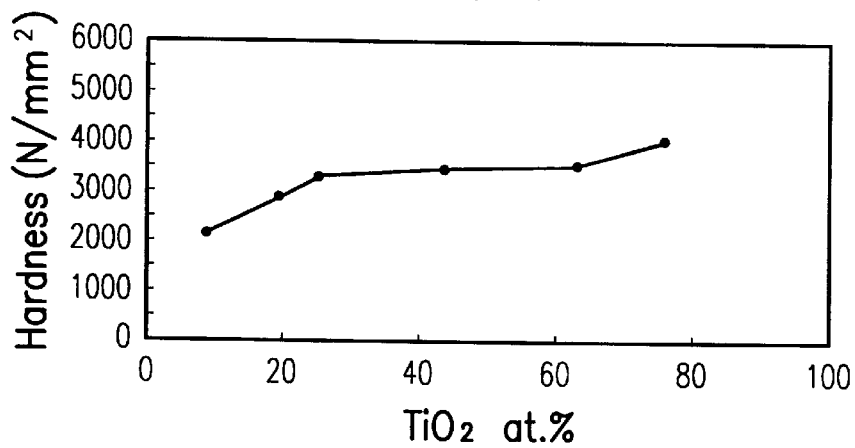
FIG. 5 is a graph showing that the hardness of the $TiO_2$—$SiO_2$ composite material varies with the $TiO_2$ composition.

Referring to FIG. 5, which illustrates the hardness of the $TiO_2$—$SiO_2$ composite material varying with the component of $TiO_2$ according to the invention. In FIG. 5, the hardness of the $TiO_2$—$SiO_2$ composite material varies directly with the component of $TiO_2$. When the component of $TiO_2$ is more than 20 at %, the hardness of the $TiO_2$—$SiO_2$ composite layer is greater than 3,000 /mm² which is greater than the hardness of 2900N/mm² of the pure $SiO_2$ layer formed under the same depostion condition except an evaporation rate less than 1 nm/s. It is found that the resistance of the $TiO_2$—$SiO_2$ measured by probe testing is infinite, indicating that the $TiO_2$—$SiO_2$ is an excellent insulator. This proves that the $TiO_2$—$SiO_2$ composite layer containing 20~75 at % $TiO_2$, used as an overcoat can efficiently prevent short circuit caused by conductive impurity having the same size as the gap between two transparent electrodes. Furthermore, since the $TiO_2$—$SiO_2$ composite layer has a high degree of hardness, using the $TiO_2$—$SiO_2$ layer as a hard layer can protect the surface of the plastic substrate, and increase the scratch resistance.

Therefore, the $TiO_2$—$SiO_2$ composite material applied to the LCD manufacturing according to the invention is versatile. First, it can be used as an isolating layer for water and gas. Since the plastic material is porous, the water and gas are readily stored inside the plastic substrate. When disposing the plastic substrate into a vacuum chamber to perform an evaporation process, the water and gas can be gradually released from the plastic substrate due to the pressure difference between outside and inside, causing poor adhesion to a deposited layer. Since the $TiO_2$—$SiO_2$ composite material formed by an ion-assisted electron gun evaporation process is an amorphous and inactive chemical material, it can not react with other surrounding chemical materials. It also prevents the plastic substrate from releasing the water and gas stored thereinside, thereby relatively enhancing the adhesion of the layer formed on the plastic substrate.

Moreover, the $TiO_2$—$SiO_2$ composite material which can be utilized as a bonding layer can solve the cracking problem caused by different thermal expansion coefficients between the ITO layer and plastic substrate due to its low thermal expansion coefficient.

Figure 6:
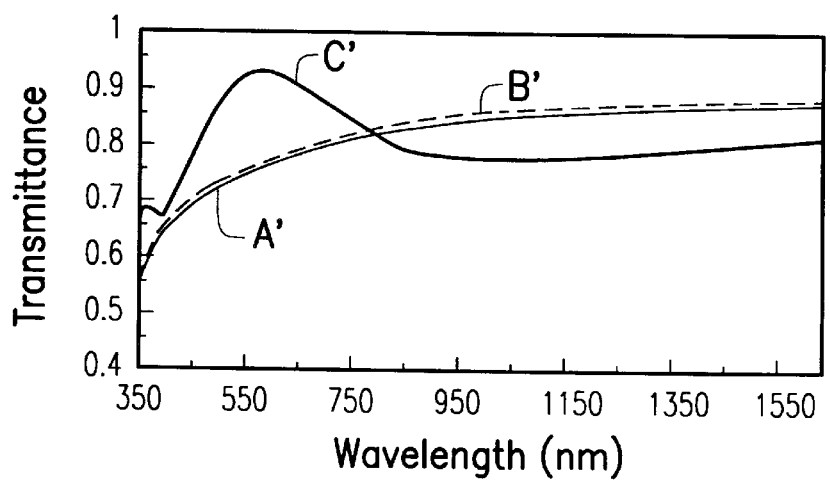
FIG. 6 is a graph showing the transmittances of transparent glass substrates having various undercoats.

In addition, the $TiO_2$—$SiO_2$ composite material which can be used as a transmittance-enhanced layer can increase the visible light transmittance of the transparent conductive electrode. FIG. 6 is a graph showing the transmittances of three different kinds of transparent conductive glass having no undercoat (curve A), $SiO_2$ layers serving as an undercoat (curve B), and $TiO_2$—$SiO_2$ layers containing 73.1% $TiO_2$ serving as an undercoat (curve C), respectively. The baisc structure of a transparent conductive glass is glass/undercoat/ITO, wherein the thickness of the undercoat and ITO layer are about 100 nm and 60 nm, respectively. As shown in FIG. 6, appropriate components and thicknesses of the undercoat ($TiO_2$—$SiO_2$ ) can enhance the optical performance of the transparent conductive electrode, that is, high transmittance to visible light and low transmittance to the infrared.

Although the invention has been disclosed in terms of a preferred embodiment, the disclosure is not intended to limit the invention. Those knowledgeable in the art can make modifications within the scope and spirit of the invention which is determined by the claims below.

What is claimed is:

1. A liquid crystal display device having undercoating and overcoating made of $TiO_2$—$SiO_2$ composite material, comprising a first transparent conductive electrode; a first polarizing plate formed on a second surface of said first transparent conductive electrode; a first aligning layer formed on a first surface of said first transparent conductive electrode; a second transparent conductive electrode separated in parallel to said first transparent conductive electrode by a predetermined distance; a second polarizing plate formed on a second surface of said second transparent conductive electrode; a second aligning layer formed on a first surface of said second transparent conductive electrode; and liquid crystal positioned between said first transparent conductive layer and said second transparent conductive layer; wherein the structure of said first transparent conductive electrode from its second surface toward its first surface includes a first soda lime glass substrate, a first $TiO_2$—$SiO_2$ composite undercoat, a first transparent conductive layer and a first $TiO_2$—$SiO_2$ composite overcoat; and the structure of said second transparent conductive electrode from its second surface toward its first surface includes a second soda lime glass substrate, a second $TiO_2$—$SiO_2$ composite undercoat, a second transparent conductive layer and a second $TiO_2$—$SiO_2$ composite overcoat.

2. A liquid crystal display device as claimed in claim 1, wherein said $TiO_2$—$SiO_2$ composite undercoats and said $TiO_2$—$SiO_2$ composite overcoat are formed by an ion-assisted electron gun evaporation or sputtering process at room temperature.

3. A liquid crystal display device as claimed in claim 1, wherein each said $TiO_2$—$SiO_2$ composite undercoat contains 20~75 at % $TiO_2$ and has a thickness of 20~150 nm, which can prevent the out diffusion of sodium ions from the said soda lime glass substrate through said transparent conductive ITO layers to said liquid crystal.

4. A liquid crystal display device as claimed in claim 1, wherein each said $TiO_2$—$SiO_2$ composite overcoat contains 20~75 at % $TiO_2$ and has a thickness of 30~100 nm, which can prevent short circuit between said electrodes caused by conductive impurities.

5. A liquid crystal display device having undercoat and overcoat made of a $TiO_2$—$SiO_2$ composite material, comprising a first transparent conductive electrode; a first polarizing plate formed on a second surface of said first transparent conductive electrode; a first aligning layer formed on a first surface of said first transparent conductive electrode; a second transparent conductive electrode separated in parallel to said first conductive electrode by a predetermined distance; a second polarizing plate formed on the second surface of said second transparent conductive layer; a second aligning layer formed on the first surface of said second transparent conductive electrode; and liquid crystal positioned between said the first aligning layer and said the second aligning layer; wherein the structure of said first transparent conductive electrode from the second surface toward the first surface includes a first polyethylene terphthalate substrate, a first $TiO_2$—$SiO_2$ composite undercoat, a first transparent conductive layer and a first $TiO_2$—$SiO_2$ composite overcoat; and the structure of said second transparent conductive electrode from the second surface toward the first surface includes a second polyethylene terphthalate substrate, a second $TiO_2$—$SiO_2$ composite undercoat, a second transparent conductive layer and a second $TiO_2$—$SiO_2$ composite overcoat.

6. A liquid crystal display device as claimed in claim 5, wherein said $TiO_2$—$SiO_2$ composite undercoat and $TiO_2$—$SiO_2$ composite overcoat are formed by an ion-assisted electron gun evaporation or sputtering process at room temperatures.

7. A liquid crystal display device as claimed in claim 5, wherein each said $TiO_2$—$SiO_2$ composite undercoat contains 20~75 at % $TiO_2$ and has a thickness of 20~150 nm, which can prevent said polyethylene terphthalate substrates from releasing water and gas contained thereinside, enhance adhesion of said transparent conductive layers deposited on said polyethylene terphthalate substrates, and prevent cracks on said transparent conductive layers caused by different thermal expansion coefficients between said polyethylene terphthalate substrates and transparent conductive layers.

8. A liquid crystal display device as claimed in claim 5, wherein each said $TiO_2$—$SiO_2$ composite overcoat contains 20~75 at % $TiO_2$ and has a thickness of 30~100 nm, which can prevent short circuit between said electrodes caused by conductive impurities.

9. A liquid crystal display device having undercoat and overcoat made of a $TiO_2$—$SiO_2$ composite material, comprising a first transparent conductive electrode; a first polarizing plate formed on a second surface of said first transparent conductive electrode; a first aligning layer formed on a first surface of said first transparent conductive electrode, a second transparent conductive electrode separated in parallel to said first transparent conductive electrode by a distance; a second polarizing plate formed on a second surface of said second transparent conductive electrode; a second aligning layer formed on a first surface of said second transparent conductive electrode; and liquid crystal positioned between said first transparent conductive electrode and said second transparent conductive electrode; wherein the structure of said first transparent conductive electrode from the second surface toward the first surface includes a first $TiO_2$—$SiO_2$ composite hard layer, a first polyethylene terephthalate substrate, a first $TiO_2$—$SiO_2$ composite undercoat, a first transparent conductive layer and a first $TiO_2$—$SiO_2$ composite overcoat; and the structure of said second transparent conductive electrode from the second surface toward said the first surface includes a second $TiO_2$—$SiO_2$ composite hard layer, a second polyethylene terephthalate substrate, a second $TiO_2$—$SiO_2$ composite undercoat, a second transparent conductive layer and a second $TiO_2$—$SiO_2$ composite overcoat.

10. A liquid crystal display device as claimed in claim 9, wherein each said $TiO_2$—$SiO_2$ composite undercoat contains 20~75 at % $TiO_2$ and has a thickness of 20~150 nm, which can prevent said polyethylene terphthalate substrates from releasing water and gas contained thereinside, enhance adhesion of said transparent conductive layers formed on said polyethylene terphthalate substrates, and prevent cracks on said transparent conductive layers caused by different thermal expansion coefficients between said polyethylene terphthalate substrates and transparent conductive layers.

11. A liquid crystal display device as claimed in claim 9, wherein each said $TiO_2$—$SiO_2$ composite overcoat contains 20~75 at % $TiO_2$ and has a thickness of 30~100 nm, which can prevent short circuits between said electrodes caused by conductive impurities.

12. A liquid crystal display device as claimed in claim 5 or 9, wherein said polyethylene terephthalate substrate can be replaced with one of materials, such as, acrylic, epoxy resin, polycarbonate.

* * * * *

UNITED STATES PATENT AND TRADEMARK OFFICE
CERTIFICATE OF CORRECTION

PATENT NO. : 5,808,715
DATED : September 15, 1998
INVENTOR(S) : Rung-Ywan Tsai and Fang-Chuan Ho It is certified that error appears in the above-identified patent and that said Letters Patent is hereby corrected as shown below:

On the title page,
Insert the following:
--Foreign Application Priority Data

March 27, 1997   Taiwan    86103964--

Signed and Sealed this

Twenty-seventh Day of July, 1999

Attest:

Q. TODD DICKINSON

*Attesting Officer*        *Acting Commissioner of Patents and Trademarks*